(12) United States Patent
Binhussain et al.

(10) Patent No.: US 8,999,873 B2
(45) Date of Patent: Apr. 7, 2015

(54) ARTIFICIAL MARBLE AND METHOD FOR MANUFACTURING THE SAME

(71) Applicant: King Abdul Aziz City for Science and Technology (KACST), Riyadh (SA)

(72) Inventors: Mohammed A Binhussain, Riyadh (SA); Esmat M A Hamzawy, Cairo (EG); Omar A Alharbi, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 55 days.

(21) Appl. No.: 13/867,069

(22) Filed: Apr. 20, 2013

(65) Prior Publication Data
US 2014/0315708 A1     Oct. 23, 2014

(51) Int. Cl.
| | | |
|---|---|---|
| C04B 35/00 | (2006.01) | |
| B29C 59/00 | (2006.01) | |
| D04H 1/00 | (2006.01) | |
| B29C 39/12 | (2006.01) | |
| C04B 20/02 | (2006.01) | |
| C04B 28/34 | (2006.01) | |
| C04B 30/00 | (2006.01) | |
| C04B 111/54 | (2006.01) | |

(52) U.S. Cl.
CPC ............. C04B 20/026 (2013.01); C04B 28/34 (2013.01); C04B 30/00 (2013.01); C04B 2111/545 (2013.01)

(58) Field of Classification Search
CPC ........ C04B 33/13; C04B 33/24; C04B 33/26; C04B 33/02; C04B 35/14; C04B 35/18; C04B 11/02; B44F 9/04; B44C 5/06; C01F 11/466
USPC .................. 501/154, 141–142, 144; 523/171; 264/122, 245
See application file for complete search history.

(56) References Cited

U.S. PATENT DOCUMENTS

| | | | | |
|---|---|---|---|---|
| 3,676,351 A | * | 7/1972 | Taki et al. ...................... | 501/136 |
| 4,134,772 A | * | 1/1979 | Ichiko et al. .................. | 501/144 |
| 4,386,387 A | * | 5/1983 | Tanei et al. ................. | 361/321.4 |
| 5,063,093 A | * | 11/1991 | Mentzer ......................... | 428/15 |
| 5,716,894 A | * | 2/1998 | Messer et al. ................. | 501/141 |
| 7,662,870 B2 | * | 2/2010 | Park et al. ..................... | 523/171 |

* cited by examiner

*Primary Examiner* — Noah Wiese
(74) *Attorney, Agent, or Firm* — Timberline Patent Law Group PLLC

(57) ABSTRACT

The invention provides an artificial marble and a method for manufacturing the artificial marble. The artificial marble is manufactured using raw materials such as silica, fluorspar and one or more waste materials. The one or more waste materials are selected from a group that includes limestone, clay, magnesite and phosphate.

8 Claims, 4 Drawing Sheets

ARTIFICIAL MARBLE AND METHOD FOR MANUFACTURING THE SAME

FIELD OF THE INVENTION

The invention generally relates to an artificial marble and a method for manufacturing the artificial marble. More specifically, the invention relates to artificial marble manufactured using raw materials such as silica, fluorspar and waste materials such as limestone, clay, magnesite, phosphate.

BACKGROUND OF THE INVENTION

Geologically, natural marble is a mono-minerallic metamorphic rock with significant calcite content. Natural marbles, such as thassoss marbles and granites, are widely used in numerous building applications all over the world. Currently, synthetic marbles are replacing natural marbles in various building applications as natural marbles are rapidly becoming scarce. The properties of artificial marbles are same as that of natural marbles. Generally, artificial marbles are prepared using fillers and synthetic resin as binder. Typically, calcium carbonate fillers are main ingredient utilized for preparing artificial marbles as calcium carbonate fillers are low in cost.

Artificial marbles can be prepared in different ways using different raw materials. Artificial marble having moderate strength can be produced by admixture of dolomite with epoxy polymer material without the heating process. An artificial variegated marble can be produced from natural stone in particulate form (powder or granule) where a batch for preparing the artificial variegated marble consisting of particulate natural stone, powdered thermosetting resin, powdered catalysts for the resin and a pigment. The artificial marbles can also be produced by admixing and binding raw materials such as inorganic quartz and organic polymers. Most of methods conventionally used to prepare artificial marble utilize binders and natural polymers such as resin, epoxy polymer or organic polymers. In some methods, natural stones are used to prepare artificial marble. However, natural stones and natural polymers might become scare after a point of time.

Therefore, there is a need to develop a method for manufacturing artificial marbles with readily available raw materials. Further, there is also a need to develop artificial marbles which are environment friendly, cost effective and has superior mechanical and chemical properties than the natural marbles.

BRIEF DESCRIPTION OF THE FIGURE

The accompanying figure together with the detailed description below forms part of the specification and serves to further illustrate various embodiments and to explain various principles and advantages all in accordance with the present invention.

DETAILED DESCRIPTION OF THE INVENTION

Before describing in detail embodiments that are in accordance with the invention, it should be observed that the embodiments reside primarily for an artificial marble and in method steps related to manufacturing the artificial marble.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Generally speaking, pursuant to various embodiments, the invention provides an artificial marble and a method for manufacturing the artificial marble. The artificial marble is manufactured using raw materials such as silica, fluorspar and one or more waste materials. The one or more waste materials are selected from a group that includes limestone, clay, magnesite and phosphate.

Figure 1:
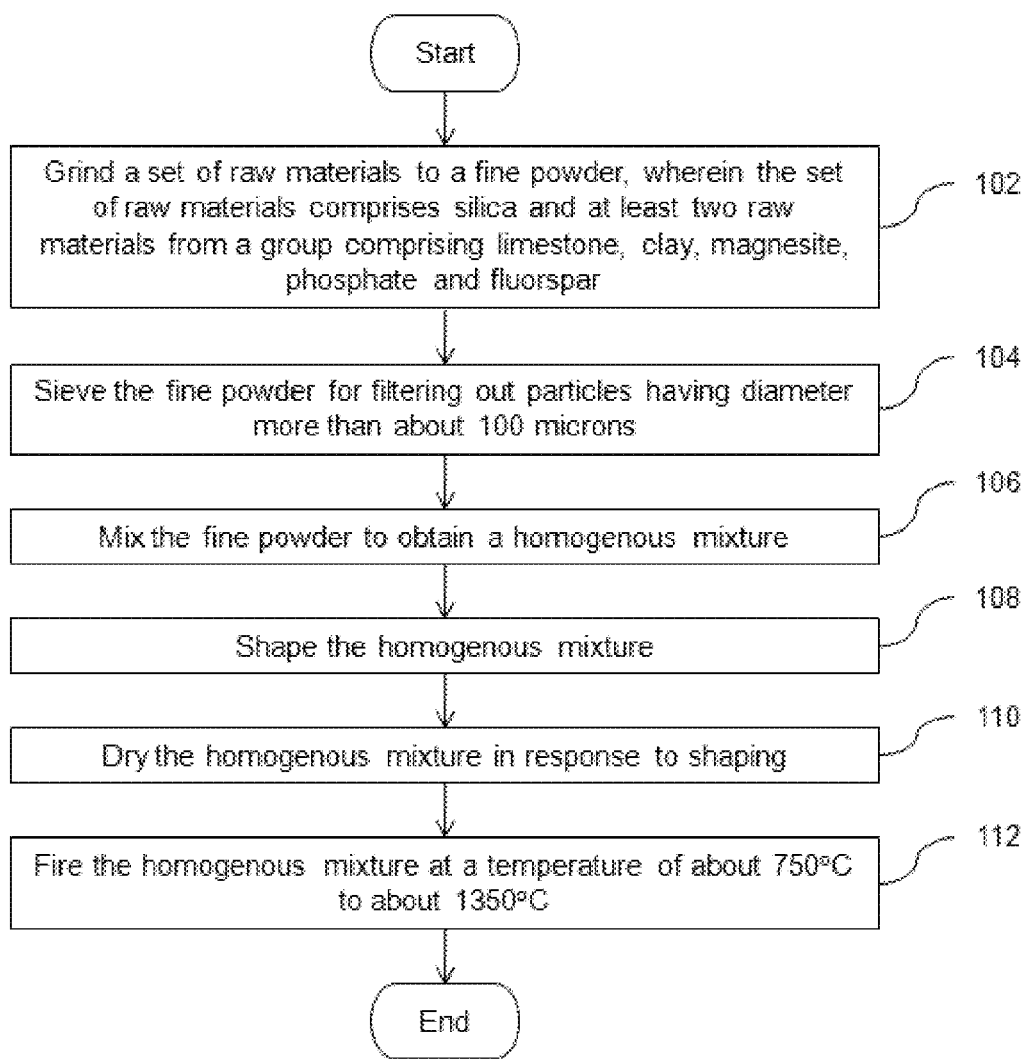
FIG. 1 illustrates a flow diagram of a method for manufacturing an artificial marble in accordance with an embodiment of the invention.

FIG. 1 illustrates a flow diagram of a method for manufacturing an artificial marble in accordance with an embodiment of the invention.

A specific set of raw materials are used to manufacture the artificial marble. The set of raw materials includes silica, fluorspar and one or more waste materials. The one or more waste materials are selected from a group that includes limestone, clay, magnesite and phosphate. The weight percentages of different oxides in each raw material are tabulated in Table 1. The oxides required to improve the properties of the artificial marbles as a final product are present in different local raw materials is in different ratios. The waste materials are selected in such a way that the selected waste materials provide required amount of crystalline phases in the final formulation of the artificial marble.

TABLE 1

| Raw materials | Chemical Composition (in wt %) | | | | | | | | |
|---|---|---|---|---|---|---|---|---|---|
| | $SiO_2$ | $Al_2O_3$ | $Fe_2O_3$ | $TiO_2$ | MgO | CaO | $Na_2O$ | $K_2O$ | I.L. |
| Magnesite | 2.12 | 0.29 | 0.04 | 0.01 | 89.54 | 1.62 | 0.09 | 0.11 | — |
| Limestone | 2.24 | 0.84 | 0.26 | 0.02 | 0.57 | 51.74 | 0.02 | 0.07 | — |
| Sandstone | 99.15 | 0.07 | 0.13 | — | — | — | — | — | — |
| Clay | 52 | 34 | 0.90 | 1.5 | 0.10 | 0.15 | 0.20 | 0.07 | 12-14 |

At step 102, a set of raw materials are ground into a fine powder. Any suitable grinding machine such as, but not limited to, a roll crusher, a ball mill or an impeller breaker can be used for grinding the set of raw materials and as such those techniques would be apparent to those ordinarily skilled in the art. In an embodiment, the set of raw materials is ground in a ball mill with a speed of about 400 revolutions per minute to about 500 revolutions per minute for a period of about 2 hours to about 3 hours.

In an embodiment, the set of raw materials includes about 30 weight percentage (wt %) to about 66 wt % of silica, about 9 wt % to about 62 wt % limestone, about 3 wt % to about 9 wt % clay, about 0 wt % to about 31 wt % magnesite, about 1 wt % to about 10 wt % phosphate and about 0 wt % to about 8 wt % fluorspar.

At step 104, the fine powder is sieved to filter out particles of diameter more than about 100 microns (μ). The processing characteristics are optimized due to the use of particles of sizes less than 100μ. The size of the particles of the set of raw materials is directly responsible for the quality of the artificial marble.

Thereafter, at step 106, the fine powder with particles of sizes less than 100μ is mixed to obtain a homogenous mixture. Any suitable mixing device can be used for mixing the fine powder with particles of sizes less than 100μ. In an embodiment, the fine powder is mixed in an agate mill to obtain the homogenous mixture. In another embodiment, the fine powder is mixed in a planetary ball mill for a period of about 2 hours to about 3 hours to obtain the homogenous mixture. Other mixing devices such as, but not limited to, magnetic stirring plates, vibrating plates, a ball mill and motor-driven stirring blades can also be used for mixing the fine powder with the particles of sizes less than 100μ.

Moving on, at step 108, the homogenous mixture is shaped. In an embodiment, the homogenous mixture is shaped using one of uniaxial cold pressing, biaxial cold pressing, dry pressing, semi-dry pressing, compacting, cold isostatic pressing, hot pressing, extrusion molding, injection molding, compression molding, gel casting, slip casting and tape casting. Any other suitable type of technique for shaping can be used at step 108 and as such the techniques which can be used would be apparent to those ordinarily skilled in the art. For example, the homogenous mixture is uniaxially cold pressed at a pressure of about 7 Megapascal (MPa) to about 10 MPa in a mold. Further, pressures used for compressing the homogenous mixture can be as high as 5 tons with different molds. In an embodiment, an isostatic pressure is used to shape the homogenous mixture. The homogenous mixture is placed into a stain less steel die. A disc is prepared by dry pressing of the homogenized mixture. The homogenous mixture in the stainless steel die is compressed in the steel cavity of the stainless steel die by steel plungers and is then ejected by a bottom plunger.

Thereafter, at step 110, the homogenous mixture is allowed to dry. In accordance with the embodiment, the homogenous mixture is dried at a temperature of about 80° C. for period of about 8 hours to about 10 hours.

Figure 2:
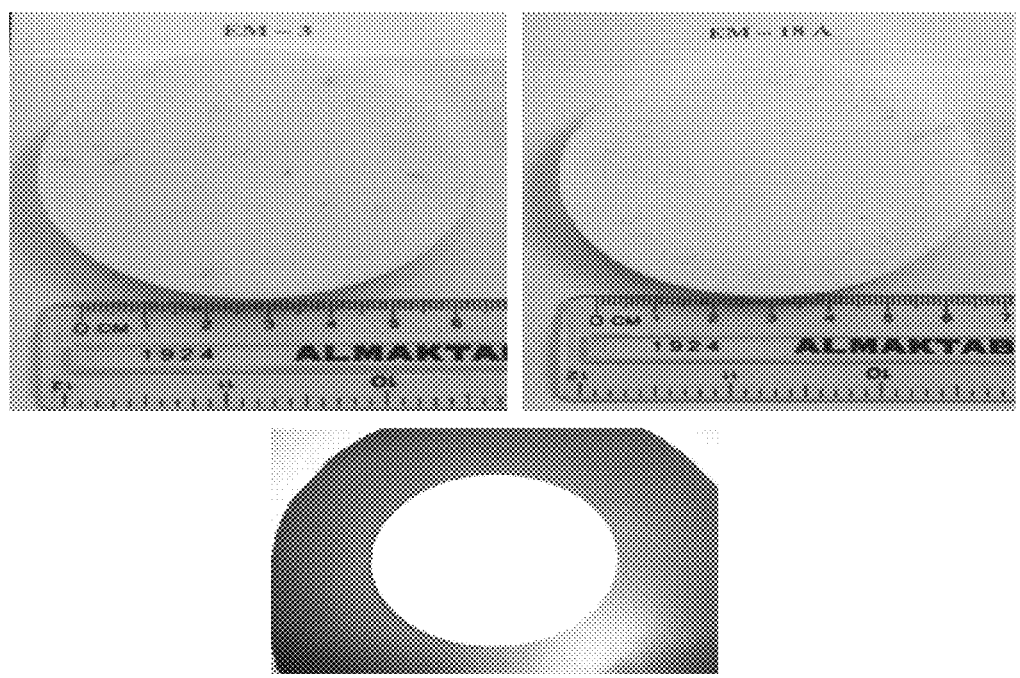
FIG. 2 illustrates different samples of artificial marbles prepared using the invention.

Finally, at step 112, the homogenous mixture is fired at a temperature about 750° C. to about 1350° C. In accordance with the embodiment, the homogenous mixture is fired at a temperature of about 750° C. to about 1350° C. with a rate of about 5° C. per minute to about 20° C. per minute for a period of about 30 minutes to about 2 hours and 30 minutes. In an embodiment, the homogenous mixture is subjected to heat treatment at 1100° C. for 2 hours before the step of firing. Thereafter, the homogenous mixture undergoes uniaxially densification process at about 30 KiloNewton (KN). After the uniaxially densification process, the homogenous mixture is fired at a temperature of about 700° C. to about 1400° C. in an electric furnace for a period of one hour at a rate of about 5° C. per minute to about 10° C. per minute. FIG. 2 illustrates different samples of artificial marbles.

In various embodiments of the invention, a composition of an artificial marble includes about 60 wt % to about 66 wt % of silicon dioxide ($SiO_2$), about 0.1 wt % to about 0.6 wt % of alumina ($Al_2O_3$), about 0.6 wt % to about 34 wt % of calcium oxide (CaO), about 0.01 wt % to about 0.04 wt % of sodium oxide ($Na_2O$), about 0.05 wt % to about 0.5 wt % of potassium oxide ($K_2O$), about 0.01 wt % of titanium dioxide ($TiO_2$), about 0.1 wt % to about 0.25 wt % of ferric oxide ($Fe_2O_3$) and about 0.3 wt % to about 38 wt % of magnesium oxide (MgO).

The artificial marble is prepared using the set of raw materials which includes silica, fluorspar and one or more waste materials. The one or more waste materials are selected from a group that includes limestone, clay, magnesite and phosphate. The weight percentages of different oxides in each raw material are tabulated in Table 1.

In an embodiment, the set of raw materials used to prepare the artificial marble includes about 30 weight percentage (wt %) to about 66 wt % of silica, about 9 wt % to about 62 wt % limestone, about 3 wt % to about 9 wt % clay, about 0 wt % to about 31 wt % magnesite, about 1 wt % to about 10 wt % phosphate and about 0 wt % to about 8 wt % fluorspar.

Working Examples

The formulation of a set of raw materials selected from table 2 is ground into fine powder in a ball mill. The fine powder is sieved to filter our particles of diameter more than 100 microns. The fine powder is then mixed in a planetary ball mill for a period of about 2 hours to about 3 hours to obtain a homogenous mixture. The homogenous mixture is uniaxially cold pressed in a mold at a pressure of 7 MPa to 10 MPa. Thereafter, the homogenous mixture is allowed to dry. After drying, the homogenous mixture is fired at a temperature of about 750° C. to about 1350° C. with a rate of about 5° C. per minute to about 20° C. per minute for a period of about 30 minutes to about 2 hours and 30 minutes.

TABLE 2

| Sample Number | Raw materials (in wt %) | | | | | |
|---|---|---|---|---|---|---|
| | Silica | Magnesite | Limestone | Clay | Phosphate | CaF2 |
| 1 | 47.67 | — | 46.51 | 5.81 | — | — |
| 2 | 47.67 | — | 46.51 | 5.81 | — | — |
| 3 | 53.65 | 37.23 | — | 9.12 | 5.0 | — |
| 4 | 51.85 | 30.83 | 8.51 | 8.81 | 1.0 | 4.0 |
| 5 | 54.73 | 21.62 | 24.64 | — | 1.0 | 5.0 |

Depending on the formulation of raw material selected from Table 2, different composition of artificial marbles is formed as tabulated in Table 3.

TABLE 3

| Sample Number | Chemical Composition | | | | | | | |
|---|---|---|---|---|---|---|---|---|
| | $SiO_2$ | $Al_2O_3$ | $Fe_2O_3$ | $TiO_2$ | MgO | CaO | $Na_2O$ | $K_2O$ |
| 1 | 65.37 | 0.59 | 0.25 | 0.01 | 0.37 | 33.36 | 0.01 | 0.5 |
| 2 | 65.37 | 0.59 | 0.25 | 0.01 | 0.37 | 33.36 | 0.01 | 0.5 |
| 3 | 61.17 | 0.17 | 0.10 | 0.01 | 37.78 | 0.68 | 0.04 | 0.05 |
| 4 | 61.32 | 0.23 | 0.12 | 0.01 | 32.461 | 5.754 | 0.04 | 0.045 |
| 5 | 60.75 | 0.36 | 0.17 | 0.01 | 22.96 | 15.67 | 0.03 | 0.05 |

The data related to properties such as density, water adsorption, Vicker's micro-hardness, shrinkage length, shrinkage width and bending strength for all the samples formed are reported in Table 4.

TABLE 4

| Sample Number | Density (g/cm³) | Water absorption (%) | Porosity (%) | Vicker's micro-hardness (GPa) | Shrinkage Length (%) | Shrinkage Width (%) | Flexural Strength (MPa) |
|---|---|---|---|---|---|---|---|
| 1 | 2.33 | 1.41 | 11.83 | 5.35 | 11.67 | 13.13 | 41.3 |
| 2 | 2.58 | 1.57 | 12.94 | 5.00 | 11.89 | 13.10 | 39.6 |
| 3 | 2.675 | 0.95 | 9.96 | 6.314 | 11.23 | 12.87 | 84.95 |
| 4 | 2.693 | 1.85 | 10.92 | 4.888 | 11.72 | 13.01 | 41.637 |
| 5 | 2.606 | 1.19 | 8.87 | 4.171 | 11.76 | 12.94 | 40.355 |

Experiments show that formulations were suitable to produce a strong and dense artificial marbles. Another, unique aspect is that the color of the homogenous mixture changes after the step of firing when the artificial marble is formed. The method steps were suitable to promote the formation of a suitable amount of liquid phase that led to viscous sintering of the embedded crystalline phases during the formation of the artificial marble.

The length and the width of artificial marble samples shrank about 11.6 to about 13.1% linearly and the density values measured by Archimedes method were about 2.33 grams per cubic centimeter (g/cc) and about 2.58 g/cc respectively. The viscous flow increased at 1300° C. leading to shrinkage of artificial marble samples but the shape of the artificial marble samples were preserved. The water absorption values for the artificial marble samples were about 0.95% to about 1.85%. As crystallization and densification occur quickly, the shape of the artificial marble samples were preserved.

Figure 3:
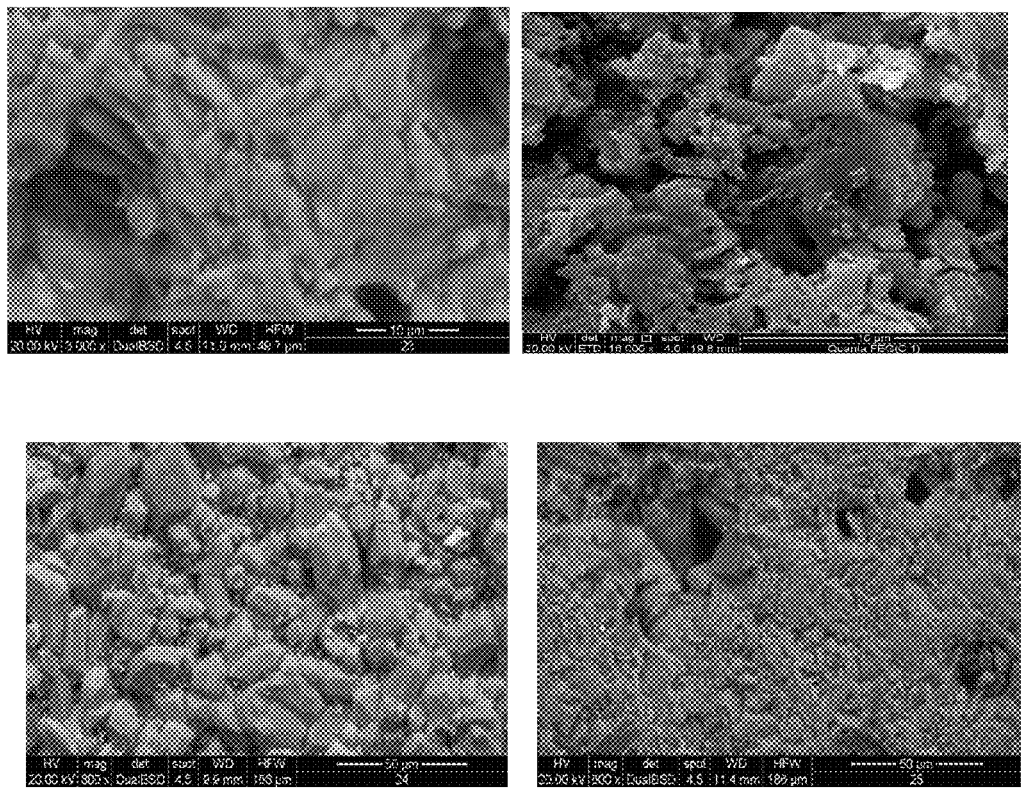
FIG. 3 illustrates scanning electronic micrographs of artificial marble samples prepared by firing at 700° C., 900° C., 1000° C. and 1300° C.
Figure 4:
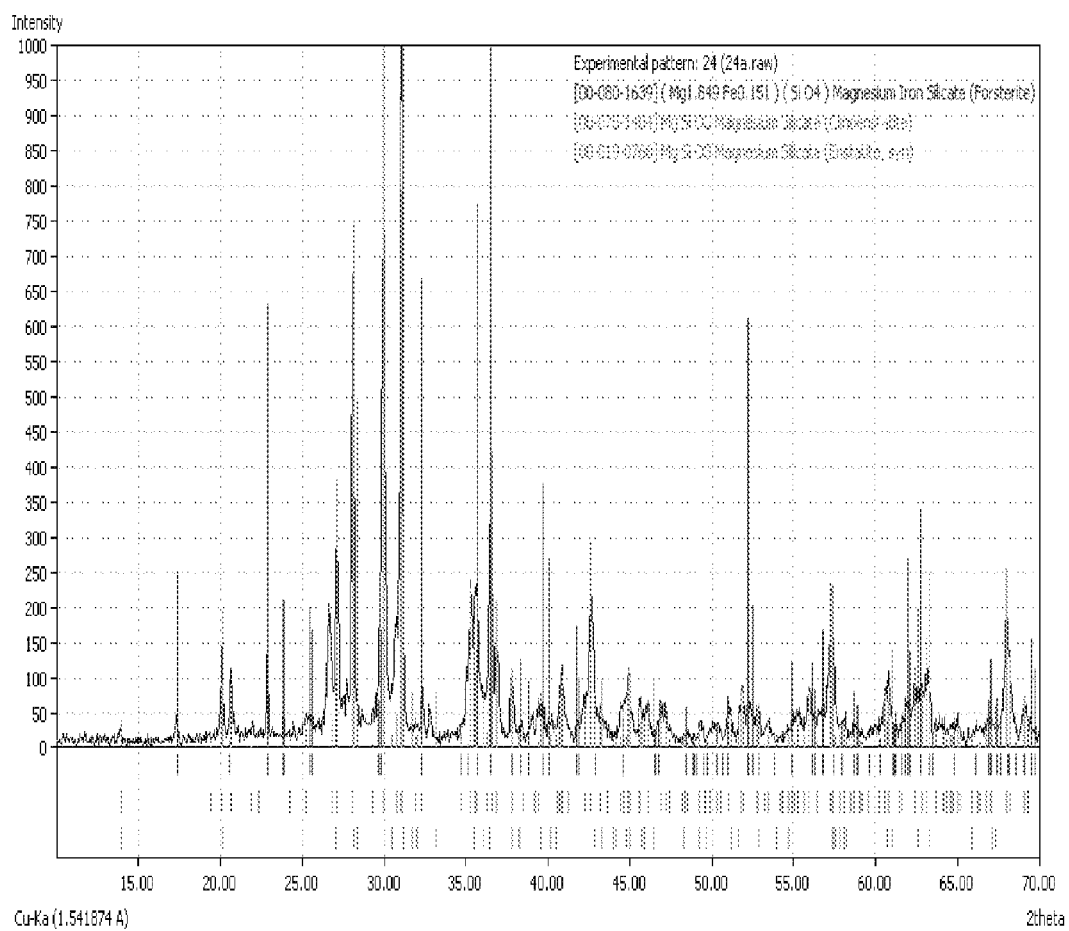
FIG. 4 illustrates X-ray diffraction pattern of artificial marble samples.

FIG. 3 illustrates scanning electronic micrographs of artificial marble samples fired at 700° C., 900° C., 1000° C. and 1300° C. The development of crystalline materials in glassy matrix with some pores in between during formation of artificial marble is shown in the micrographs in FIG. 3. In a sample treated up to 1300° C., irregular crystals connected by glassy ground mass with tiny pores is seen. The irregular crystals are clearly impregnated through the glassy matrix with pores in between. The surface is rough with high crystallization in tight areas of the glassy matrix. Some cracks were observed in samples due to phase transformations between enstatite polymorphs. Furthermore, the transformation of quartz-beta to quartz-alpha at 570° C. might have caused the cracking High percentage of wollastonite, clinoenstatite and enstatite with inclusion of augite and akermanite was observed and confirmed by the X-Ray Diffraction (XRD) analysis as shown in FIG. 4.

Various embodiments of the invention produce artificial marbles with significantly improved properties. Table 5 tabulates a comparison data of properties, such as density, water absorption, Vicker's micro-hardness and flexural strength, of artificial marble samples with the properties of thassoss marble and granite. The comparison data was generated based on test results. The main crystalline phases are Ca—, CaMg— or Mg— Silicates containing crystalline phases. These phases provide better mechanical and thermal properties to the artificial marble. Additionally, the chemical durability of the artificial marble is also enhanced.

TABLE 5

| | Properties (average) | | | | |
|---|---|---|---|---|---|
| Samples | Density (g/cm3) | Water absorption (%) | Porosity (%) | Vicker's micro-hardness (GPa) | Flexural Strength (MPa) |
| Artificial marble | 2.27 | 1.61 | 10.9 | 5.16 | 47.4-62.2 |
| Natural marble | 2.65 | 0.300 | 4.6 | 5.0-5.5 | 33.9 |
| Thassoss Marble | 2.80 | 0.23 | 0.37 | 3.2-5.60 | 31.4 |
| Granite | 2.70 | 0.35 | 4.3 | 6.0 | 45 |

Due to the different properties of the artificial marble, the artificial marble can be used in various industries, laboratories, technologies and household applications. The artificial marbles can be used to replace the natural marble as natural marbles are rapidly becoming scarce. Due to different crystalline phases such as wollastonite, pseudo-wollastonite, enstatite and diopside formed, the artificial marbles can be used in construction materials for covering walls with high-wear, floors and sanitary products.

Various embodiments of the invention provide artificial marbles which leads to conversion of waste materials and ready available raw materials into a substance with superior properties than natural marbles. The waste materials and readily available raw materials used to prepare artificial marble are more than 90% while additives such as fluorspar are in commercial grade, precisely is less than 5%.

Various embodiments of the invention provide an environment friendly artificial marble as various waste materials are used to manufacture the artificial marble.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for manufacturing an artificial marble, the method comprising:

grinding a set of raw materials to a fine powder in a ball mill with a speed of about 400 revolutions per minute to about 500 revolutions per minute for a period of about 2 hours to about 3 hours, wherein the set of raw materials comprises silica and at least two raw materials from a group comprising limestone, clay, magnesite, phosphate and fluorspar;

sieving the fine powder for filtering out particles having diameter more than about 100 microns;

mixing the fine powder to obtain a homogenous mixture;

shaping the homogenous mixture;

drying the homogenous mixture in response to shaping; and firing the homogenous mixture at a temperature of about 750° C. to about 1350° C.

2. The method of claim 1, wherein the set of raw materials comprises about 30 weight percentage (wt %) to about 66 wt % of silica, about 9 wt % to about 62 wt % limestone, about 3 wt % to about 9 wt % clay, about 0 wt % to about 31 wt % magnesite, about 1 wt % to about 10 wt % phosphate and about 0 wt % to about 8 wt % fluorspar.

3. The method of claim 1, wherein the fine powder is mixed in an agate mill to obtain the homogenous mixture.

4. A method for manufacturing an artificial marble, the method comprising:

grinding a set of raw materials to a fine powder, wherein the set of raw materials comprises silica and at least two raw materials from a group comprising limestone, clay, magnesite, phosphate and fluorspar;

sieving the fine powder for filtering out particles having diameter more than about 100 microns;

mixing the fine powder to obtain a homogenous mixture;

shaping the homogenous mixture;

drying the homogenous mixture in response to shaping;

firing the homogenous mixture at a temperature of about 750° C. to about 1350° C.; and mixing the fine powder in a planetary ball mill for a period of about 2 hours to about 3 hours to obtain the homogenous mixture.

5. The method of claim 1, wherein the homogenous mixture is shaped using one of uniaxially cold pressing, biaxial cold pressing, dry pressing, semi-dry pressing, compacting, cold isostatic pressing, hot pressing, extrusion molding, injection molding, compression molding, gel casting, slip casting and tape casting.

6. The method of claim 1, wherein the homogenous mixture is fired at a temperature of about 750° C. to about 1350° C.

7. A composition of an artificial marble comprising about 60 wt % to about 66 wt % of silicon dioxide ($SiO_2$), about 0.1 wt % to about 0.6 wt % of alumina ($Al_2O_3$), about 0.6 wt % to about 34 wt % of calcium oxide (CaO), about 0.01 wt % to about 0.04 wt % of sodium oxide ($Na_2O$), about 0.05 wt % to about 0.5 wt % of potassium oxide ($K_2O$), about 0.01 wt % of titanium dioxide ($TiO_2$), about 0.1 wt % to about 0.25 wt % of ferric oxide ($Fe_2O_3$) and about 0.3 wt % to about 38 wt % of magnesium oxide (MgO).

8. The composition of claim 7, wherein a set of raw materials for preparing the composition of the artificial marble comprises about 30 wt % to about 66 wt % of silica, about 9 wt % to about 62 wt % limestone, about 3 wt % to about 9 wt % clay, about 0 wt % to about 31 wt % magnesite, about 1 wt % to about 10 wt % phosphate and about 0 wt % to about 8 wt % fluorspar.

* * * * *